United States Patent
Cyron et al.

(10) Patent No.: US 9,479,057 B2
(45) Date of Patent: Oct. 25, 2016

(54) CIRCUIT ARRANGEMENT FOR SUPPLYING AN OUTPUT CURRENT TO A LOAD

(75) Inventors: Michael Cyron, Karlsruhe (DE); Arnold Klamm, Kandel (DE)

(73) Assignee: Siemens Aktiengesellschaft, Munich (DE)

( * ) Notice: Subject to any disclaimer, the term of this patent is extended or adjusted under 35 U.S.C. 154(b) by 928 days.

(21) Appl. No.: 12/775,187

(22) Filed: May 6, 2010

(65) Prior Publication Data
US 2010/0283443 A1   Nov. 11, 2010

(30) Foreign Application Priority Data

May 8, 2009   (EP) ..................................... 09159778

(51) Int. Cl.
*H02M 3/156*   (2006.01)
*H02M 3/158*   (2006.01)

(52) U.S. Cl.
CPC ........... *H02M 3/1584* (2013.01); *H02M 3/156* (2013.01)

(58) Field of Classification Search
USPC .......................................... 323/282, 283, 284
See application file for complete search history.

(56) References Cited

U.S. PATENT DOCUMENTS

| | | | |
|---|---|---|---|
| 4,492,179 A * | 1/1985 | Folkins et al. .................. | 399/55 |
| 4,924,170 A | 5/1990 | Henze | |
| 5,200,643 A | 4/1993 | Brown | |
| 5,834,925 A | 11/1998 | Chesavage | |
| 5,886,477 A * | 3/1999 | Honbo et al. ........... | 315/209 PZ |
| 6,822,426 B1 | 11/2004 | Todd et al. | |
| 7,545,610 B2 | 6/2009 | Nagata | |
| 2006/0273740 A1* | 12/2006 | Saeueng et al. .............. | 315/291 |
| 2006/0290333 A1* | 12/2006 | Fukushi et al. ............... | 323/277 |
| 2007/0145964 A1* | 6/2007 | Katoh ............................ | 323/285 |
| 2008/0007318 A1* | 1/2008 | Pace et al. ..................... | 327/396 |
| 2008/0278127 A1* | 11/2008 | Nagata .......................... | 323/276 |

FOREIGN PATENT DOCUMENTS

| | | |
|---|---|---|
| CN | 1969244 | 5/2007 |
| DE | 10 2005 014 992 | 7/2006 |
| DE | 102005014992 A1 * | 7/2006 |
| TW | 423204 | 2/2001 |

* cited by examiner

*Primary Examiner* — Jeffrey Gblende
(74) *Attorney, Agent, or Firm* — Cozen O'Connor

(57) ABSTRACT

A circuit arrangement for supplying an output current to a load which is useable in power supplies and is connectable in parallel to other circuit arrangements, wherein effects of component tolerances on a uniform working load are avoided.

5 Claims, 5 Drawing Sheets

CIRCUIT ARRANGEMENT FOR SUPPLYING AN OUTPUT CURRENT TO A LOAD

BACKGROUND OF THE INVENTION

1. Field of the Invention

The invention relates to current supplies and, more particularly, to a circuit arrangement for supplying an output current to a load.

2. Description of the Related Art

DE 10 2005 014 992 A1 discloses a circuit arrangement suited for use in power supplies and/or sources which are to be connected in parallel. Power supplies and/or sources which are connected in parallel together provide a total current to a load, which is greater than the maximum current of the respective power supply and/or source. Here, a uniform percentage working load of the voltage sources with respect to their respective maximum supply current is ensured. As a result of tolerances of the components used, smaller voltage differences may develop between the outputs of the voltage sources, which already causes a larger, non-uniform load distribution of these voltage sources. It is possible, for instance, to theoretically embody a first and a second source such that each of these sources contributes to a nominal current In (100%-load supply full load) for supplying a current 2·In (200%-load supply) to a load. In practice, however, because of component tolerances, one of these sources only supplies a current of 0.8·In (80%-load supply) and the other source supplies 1.2·In (120%-load supply).

SUMMARY OF THE INVENTION

It is therefore an object of the present invention to provide a circuit arrangement, which is suited for use in power supplies that are to be connected in parallel, where the effects of component tolerances on a uniform working load are largely avoided.

This and other objects and advantages are achieved by providing a switching arrangement or source for supplying an output current to a load having a voltage divider of a switching controller connected to a reference potential and a load connection point of the load, where the voltage divider is connected in parallel to the load. A feedback branch connects a voltage divider to a connecting point of the voltage divider to the switching controller. A first constant voltage is set by the switching controller regardless of an output current on the feedback branch. A first device detects the ouput current using a first measuring resistance and influences the feedback branch such that a second voltage changes between the load connection point and the voltage divider connection point, where the first and second voltages together produce an output voltage applied to the load. A second device of the source is connected in parallel with the first device. Preferably, the second device comprises an integrator, which initially start to integrate over time from a certain threshold and reduce the output voltage. With a 100% load supply, an output current exceeding the nominal current of the respective source is preferably selected here as a threshold. As a result, when two or more of the sources are connected in parallel, the integrator reduces the requirements placed on tolerances of the components of the sources which are connected in parallel, where an adequate balancing of the output currents and/or the output powers of the source consequently is achieved. It is not necessary for the sources to provide reserves beyond their respective specified maximum output. The more uniform power distribution provides an improved thermal distribution which, in turn, signifies a more uniform ageing of the sources. Furthermore, requirements, such as component tolerances are reduced. As a result, considerably more cost-effective resistors are used for example.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

On the basis of the drawings, in which exemplary embodiments of the invention are illustrated, the invention, its embodiments and advantages are explained in more detail below, in which.

DETAILED DESCRIPTION OF THE PRESENTLY PREFERRED EMBODIMENTS

Figure 1:
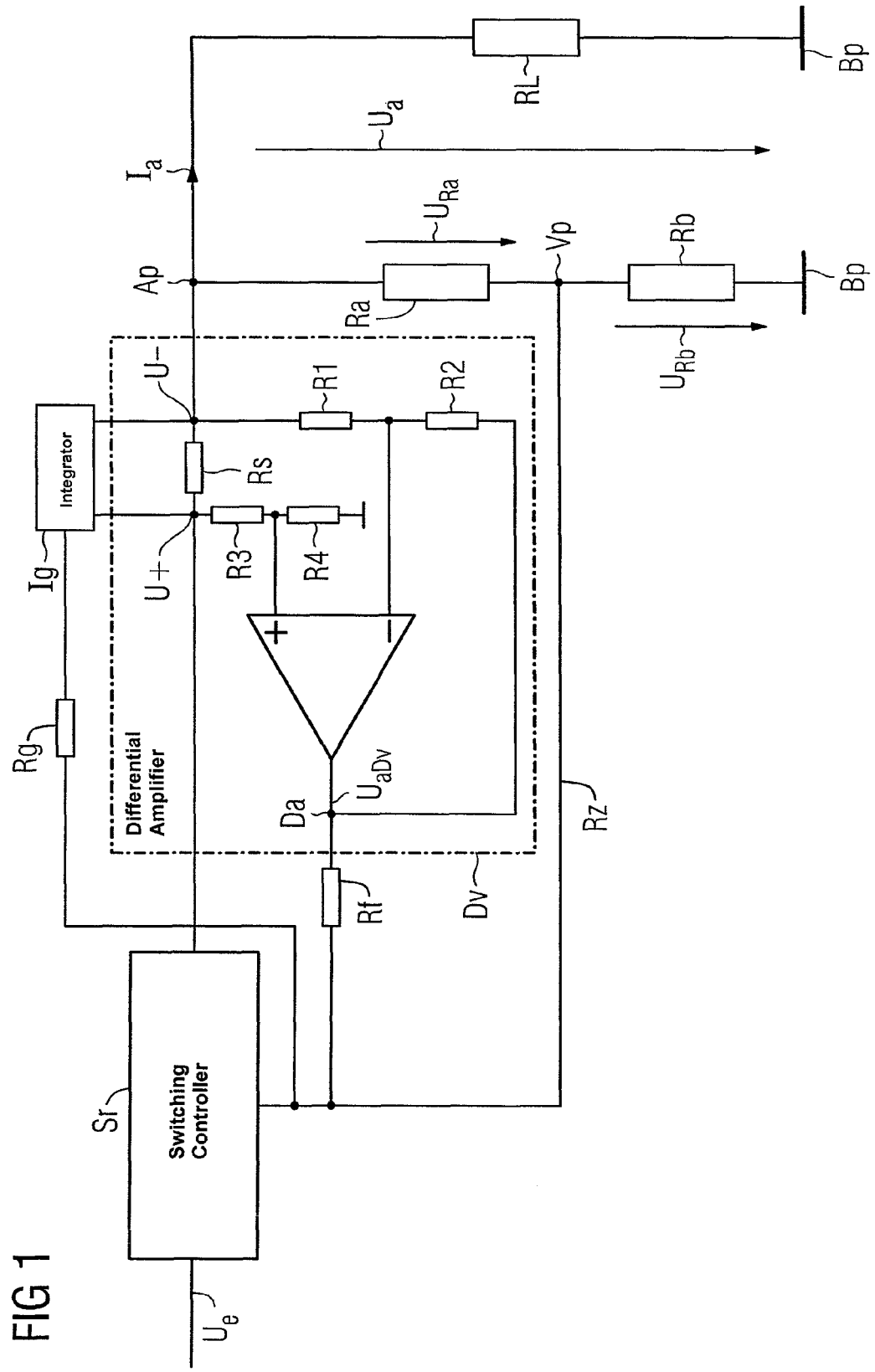
FIG. 1 shows a circuit arrangement for supplying an output current to a load in accordance with the invention.

The same parts shown in FIGS. 1 to 5 are provided with the same reference characters.

FIG. 1 designates with Sr a switching controller of a circuit arrangement which is provided with a suitable protective circuit, where the Sr generates an output voltage $U_a$ from an input voltage $U_e$ for a load RL which is connected to a connection point Ap and a reference potential Bp. A feedback branch Rz is connected to a connecting point Vp of a voltage divider which is connected in parallel to the load RL and provided with resistors Ra, Rb. Irrespective of an output current $I_a$, the switching controller Sr adjusts a constant voltage $U_{Rb}$ to this feedback branch Rz. To influence this feedback branch Rz, a differential amplifier Dv is provided, which detects the output voltage $U_a$ across a low-impedance measuring resistor Rs with, as a function of the output current $I_a$ at the output Da of the differential amplifier Dv, a voltage $U_{aDv}$ varying between a value 0V (output current $I_a$=0, idle) and a maximum value (maximum output current, full load). As a result of this influence of the feedback branch Rz, a voltage $U_{Ra}$ on the resistor Ra of the voltage divider changes as a function of the output current $I_a$. The protective circuit of the differential amplifier Dv with resistors R1, R2, R3, R4 and the voltage divider with the resistors Ra, Rb is dimensioned such that the voltage $U_{aDv}$ at the output Da of the differential amplifier Dv does not exceed the voltage $U_{Rb}$ at the connecting point Vp of the voltage divider. The functionality and efficiency of a circuit arrangement comprising a switching controller, a differential amplifier and a voltage divider, with this switching arrangement being provided to supply an output current to a load which is connected in parallel with the voltage divider, is known from DE 10 2005 014 992 A1 and does not therefore need to be explained in more detail. Details relating hereto, in particular in respect of the dimensioning of the components, are to be inferred from this publication.

To limit the output voltage $U_a$ to a predeterminable value, if the output current $I_a$ exceeds a limit value, the circuit arrangement comprises an integrator Ig with a high-impedance input, which likewise detects the output current $I_a$ on the measuring resistor Rs and the output of which is connected to the switching controller Sr by a resistor Rg, with the resistors Rg, Rf, Rb being dimensioned identically. A current is provided as a limit value, for instance, which can be fed to the load RL during continuous operation within the scope of a maximum achievable output. In the present exemplary embodiment, this current, identified as a nominal current describes an oblique load characteristic curve.

Figure 2:
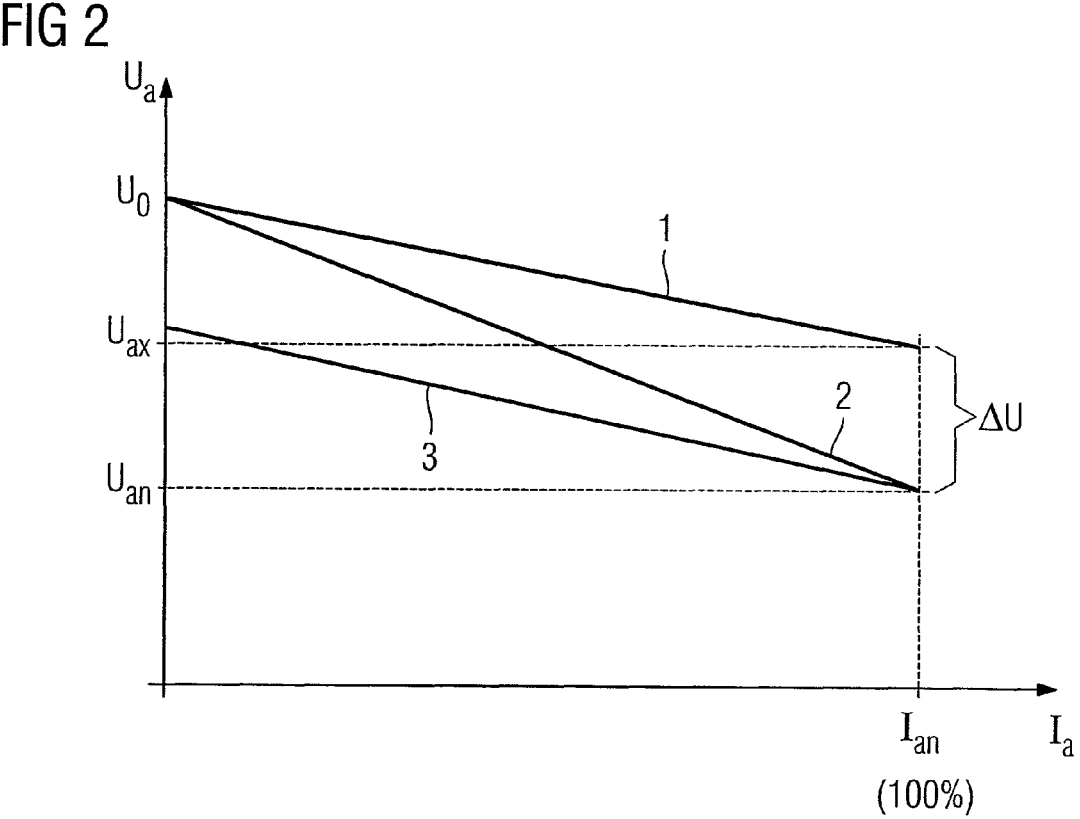
FIGS. 2 and 4 show exemplary graphical plots of load characteristic curves.

In this context, reference is made to FIG. 2, in which a first, second and third load characteristic curve 1, 2, 3 are shown which indicate the dependency of the output current $I_a$ on the output voltage $U_a$. The first characteristic curve 1 describes an uncontrolled current-voltage curve, with it being assumed that as a result of tolerances of the used components during full load, a voltage $U_{ax}$ and a nominal voltage $I_{an}$ deviating from a nominal voltage $U_{an}$ by a voltage difference AU are adjusted. This deviation provides a continuously excessive power output during full load.

In the present exemplary embodiment, the equation below generally applies to the current-voltage curve:

$$U_a = m \cdot I_a + U_o,$$

with "m" indicating a negative incline and "$U_o$" indicating the idle voltage (no current flow, $I_a = 0$).

To prevent the influence of tolerances, the integrator Ig engages in the feedback branch Rz such that either the incline m (characteristic curve 2) or the idle voltage (characteristic curve 3) is reduced so that the output voltage $U_a$ corresponds to the nominal voltage $U_{an}$ at full load and/or when the load RL is supplied with the nominal current $I_{an}$.

Figure 3:
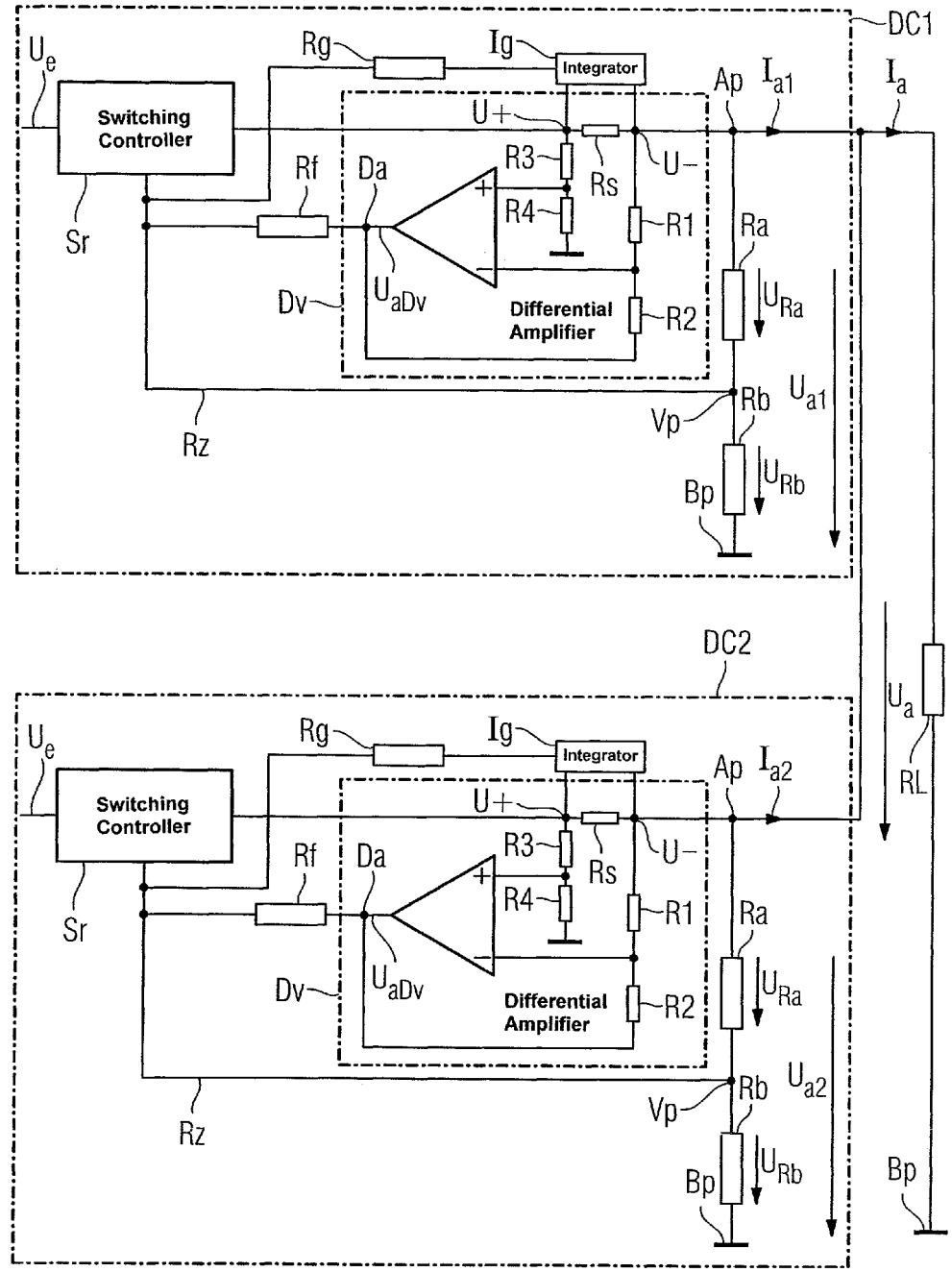
FIGS. 3 and 5 show circuit arrangements which are connected in parallel in accordance with embodiments of the invention.

FIG. 3 depicts a first and a second circuit arrangement in accordance with the arrangement of FIG. 1 connected in parallel, which are designated with DC1, DC2. Here, it should be noted that the circuit arrangements DC1, DC2 (sources) are essentially embodied identically and that an input voltage $U_e$ is fed thereto respectively. It should also be noted that the respective maximum output power of these two sources DC1, DC2 is identical and that the load RL can consume the maximum output power (100%) of each of these two sources DC1, DC2, i.e., twice the output power (200%) of a source DC1, DC2. Furthermore, it should be noted that the idle voltages $U_o$ of both sources DC1, DC2 are identical and that 105% of the output power (the nominal power) is provided as a threshold for the integrator of the respective source DC1, DC2. Consequently, 1.05 times the nominal current $I_{an}$ is allowed for the respective source DC1, DC2 as the output current $I_a$.

In the event that as a result of tolerances of the components for instance, the first source DC1 currently supplies 86% of its maximum output power and the second source DC2 100% of its maximum output power to supply the load RL with the necessary power, where the load RL consumes 1.86 times an individual source DC1, DC2 during full load operation. In the event that the load RL is to be supplied with the provided maximum output power (200%) of the sources DC1, DC2 which are connected in parallel and no integrators Ig are provided, the second source DC2 continuously supplies 110% of its maximum output power for instance, with the first source DC1 by contrast only being loaded with 90% of its maximum output power.

As a result of 105% of the output power being provided as a threshold of the respective integrator of the source DC1, DC2, as assumed, the integrator Ig of the second source DC2 limits and/or restricts the constant power output of this source DC2 to this threshold, with the integrator Ig engaging in the feedback branch Rz of the second source DC2 such that either the incline m (characteristic curve 2, FIG. 2) or the idle voltage (characteristic curve 3, FIG. 2) is reduced. As a result, the output voltage $U_{a2}$ of the more heavily loaded second source DC2 is reduced, thereby resulting in a lower current flow of this higher loaded source DC2. This current $I_{a2}$ of the second source DC2 which is reduced by the integrator Ig, due to the restricted current output of the second source DC2. The current $I_{a2}$ is also balanced by a higher current output and/or a higher current $I_{a1}$ of the lesser loaded first source DC1. As a result, the largest power difference between the two sources is only 10%, because the first source DC1 applies 95% and the second source DC2 applies 105% of the respective power.

Figure 4:
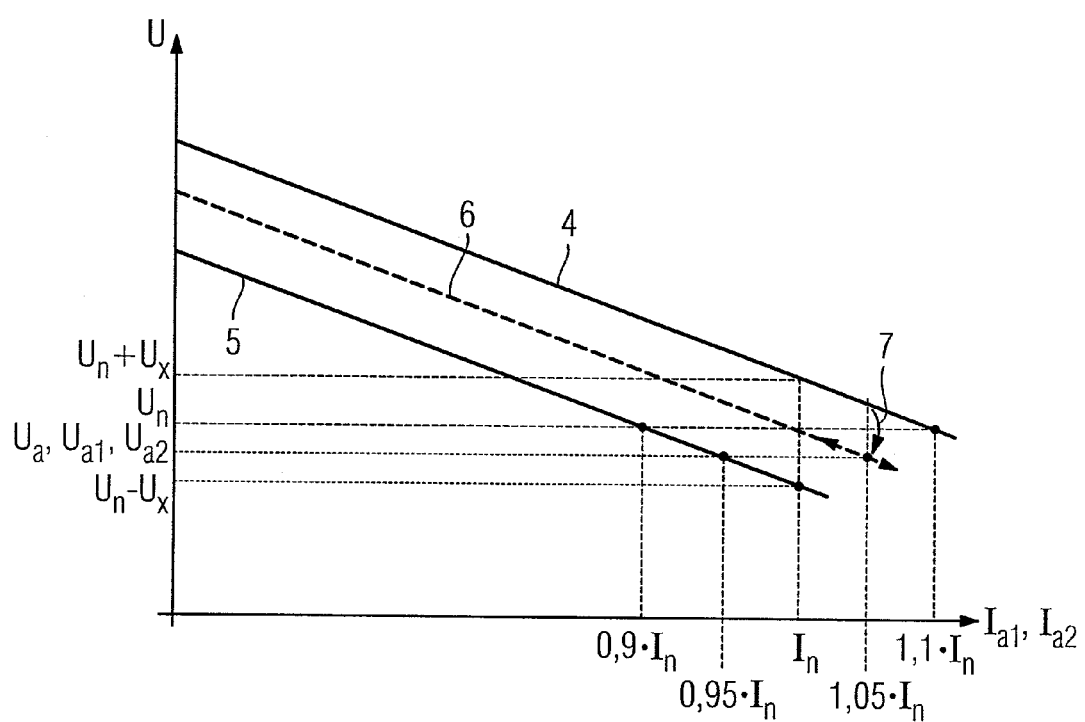

To illustrate the restriction of the output voltage $U_{a2}$ of the second source DC2, reference is made in this context to FIG. 4, in which load characteristic curves 4, 5, 6 of the first and second source DC1, DC2 are shown using the above-described assumptions. The respective nominal voltage is designated with $U_n$, and the respective nominal current of the first and second source DC1, DC2 is designated with $I_n$. As a result of tolerances of the used components, the power output of the sources DC1, DC2 is not identical (characteristic curve 4, 5). The first source DC1 generates the nominal current $I_n$ in the case of a nominal voltage $U_n$ increased by a value $U_x$, the second source DC2 by contrast generates the nominal current $I_n$, in the case of a nominal voltage $U_n$ reduced by the value $U_x$. As assumed, the second source DC2 would, without the integrator Ig, supply 1.1 times the nominal current $I_n$ as an output current $I_{a2}$ (characteristic curve 4) to the load RL in the case of the nominal voltage $U_n$ and/or full load of this source DC2. In contrast, the first source DC1 would, at full load, supply 0.9 times the nominal current $I_n$ as output current $I_{a1}$ (characteristic curve 5) to this first source DC1 and/or in the case of nominal voltage $U_n$. Here, the second source DC2 is overloaded, with the overload being above the permitted threshold, i.e., the power output exceeding 1.05 times the output power at nominal voltage $U_n$.

As a result of the integrator Ig of the second source DC2, the output voltage $U_{a2}$ of the second source DC2 is limited, however, because the output current $I_{a2}$ thereof reaches and/or exceeds the 1.05 times nominal current $I_n$. The load characteristic curve 6 of the second source DC2 is reduced, this being indicated in the drawing by the reference characters 7 and a characteristic curve 5 of this second source DC2. This restriction reduces the overload, with the power output of the second source being restricted to 1.05 times the output power at full load. Here, the output voltages $U_{a1}$, $U_{a2}$ of the sources DC1, DC2 and thus the voltage $U_a$ on the load RL are less than the nominal voltage $U_n$. The restriction of the current output of the second source DC2 is balanced by a higher current output and/or a higher current $I_{a1}$ of the less loaded first source DC1, with the output current $I_{a1}$ of the first source DC1 increasing to 0.95 times the nominal current $I_n$.

Figure 5:
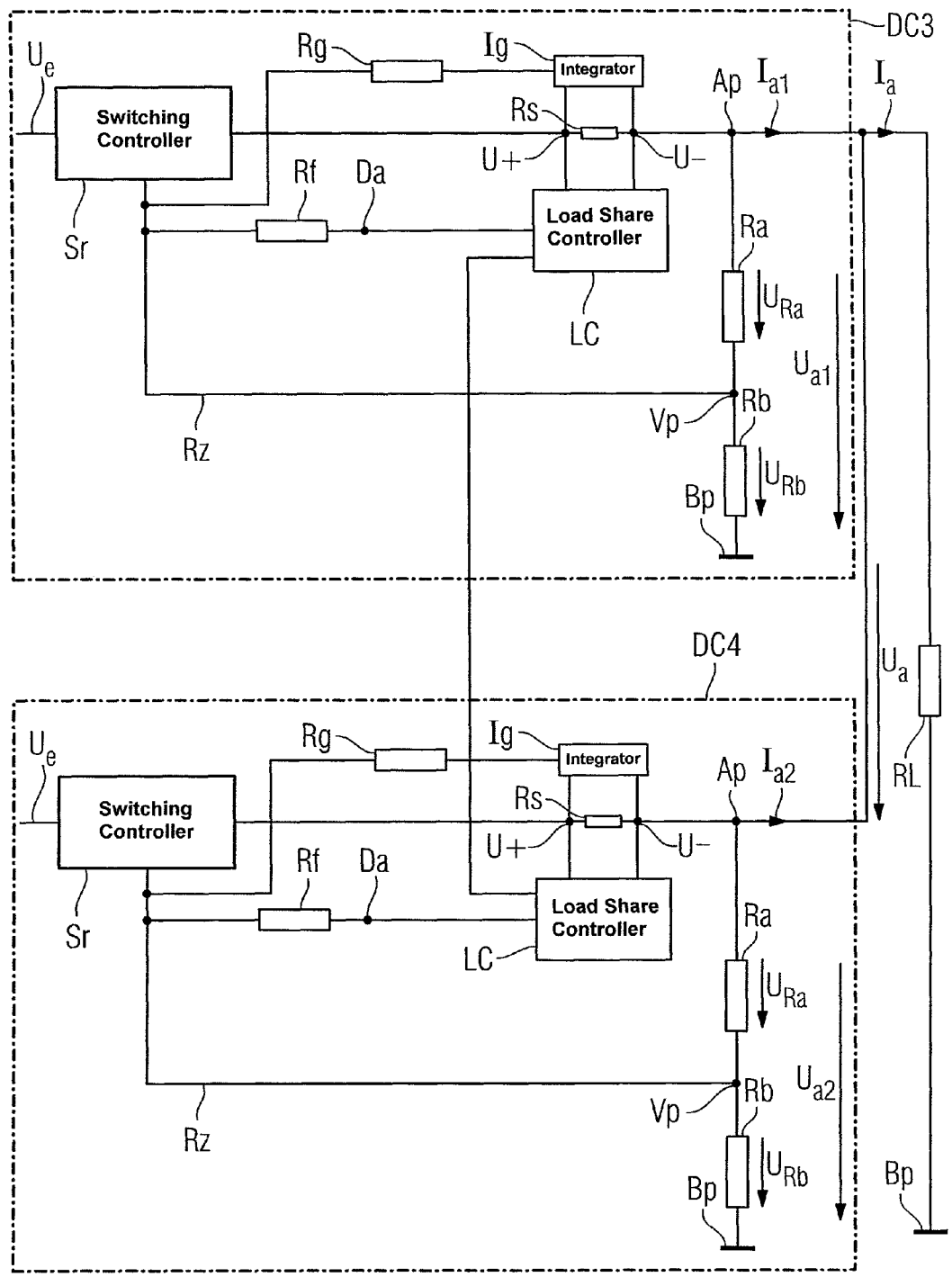

FIG. 5 shows an embodiment of two circuit arrangements DC3, DC4 which are connected in parallel, with the presently contemplated embodiment being provided with a load share controller which is known per se instead of with a differential amplifier in each instance. These controllers LC communicate over a communication line K1, by which the controllers LC exchange information, such as information relating to the degree of the power already provided to the load RL. Integrators Ig are also provided here, by which component tolerances are compensated to achieve an essentially symmetrical working load of the sources DC3, DC4.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A switching arrangement for supplying an output current to a load, comprising:
   a switching controller;
   a voltage divider of the switching controller connected to a reference potential and a load connection point of the load, the voltage divider being connected in parallel to the load;
   a feedback branch connecting a voltage divider connecting point of the voltage divider to the switching controller, the switching controller setting a first constant voltage irrespective of an output current on the feedback branch;
   a first device which detects the output current using a first measuring resistor and influences the feedback branch such that a second voltage between the voltage divider connecting point and the load connection point changes as a function of the output current, the first and second voltages being applied to the load as an output voltage; and
   a second device coupled in parallel with the first device and connected to the feedback branch, the second device being configured such that during a full load the second device engages in the feedback branch to reduce one of an incline of a current-voltage curve and an idle voltage of the current-voltage curve to restrict or reduce the output voltage to a predetermined value if the output current one of reaches or exceeds a limit value.

2. The switching arrangement as claimed in claim 1, wherein the first device comprises one of a differential amplifier or a load share controller, an output of one of the differential amplifier and the load share controller being connected to the voltage divider connecting point.

3. The switching arrangement as claimed in claim 1, wherein the second device includes an integrator which detects the output current using the measuring resistor.

4. The switching arrangement as claimed in claim 2, wherein the second device includes an integrator which detects the output current using the measuring resistor.

5. A DC power supply for supplying a load comprising a plurality of the switching arrangements of claim 1 which are connected in parallel.

* * * * *